(12) United States Patent
Higashijima et al.

(10) Patent No.: US 8,431,629 B2
(45) Date of Patent: Apr. 30, 2013

(54) WET FRICTION MATERIAL INCLUDING AN INORGANIC FILLER

(75) Inventors: Yuko Higashijima, Nagoya (JP); Ryouhei Hoshino, Anjo (JP); Takuya Muranaka, Aichi-gun (JP)

(73) Assignee: Aisin Kako Kabushiki Kaisha, Aichi-ken (JP)

( * ) Notice: Subject to any disclaimer, the term of this patent is extended or adjusted under 35 U.S.C. 154(b) by 302 days.

(21) Appl. No.: 12/187,822

(22) Filed: Aug. 7, 2008

(65) Prior Publication Data

US 2009/0043011 A1 Feb. 12, 2009

(30) Foreign Application Priority Data

Aug. 10, 2007 (JP) ................................. 2007-210090
Jun. 19, 2008 (JP) ................................. 2008-159914

(51) Int. Cl.
*C08J 5/14* (2006.01)
(52) U.S. Cl.
USPC ........... 523/155; 523/149; 523/152; 523/156; 523/157
(58) Field of Classification Search ........... 523/149–159
See application file for complete search history.

(56) References Cited

U.S. PATENT DOCUMENTS

| | | | | |
|---|---|---|---|---|
| 4,735,975 A | * | 4/1988 | Iwata et al. ................ | 523/152 |
| 5,576,358 A | * | 11/1996 | Lem et al. ................ | 523/153 |
| 5,969,001 A | * | 10/1999 | Kawai ................ | 523/158 |
| 6,316,083 B1 | * | 11/2001 | Kawabata et al. ............ | 428/212 |
| 6,534,565 B1 | * | 3/2003 | Gardner et al. ................ | 523/149 |
| 2004/0121145 A1 | * | 6/2004 | Kawabata et al. ............ | 428/331 |
| 2007/0144696 A1 | | 6/2007 | Amma et al. | |

FOREIGN PATENT DOCUMENTS

| | | |
|---|---|---|
| CN | 1292465 A | 4/2001 |
| CN | 1603379 A | 4/2005 |
| EP | 1203897 A1 | 5/2002 |
| JP | 03-140334 | 6/1991 |
| JP | 09-104764 * | 4/1997 |
| JP | H11-061105 * | 3/1999 |
| JP | 11-500151 | 6/1999 |
| JP | 2003-322185 | 11/2003 |
| JP | 2004-138121 A | 5/2004 |
| WO | 96/23952 | 8/1996 |

OTHER PUBLICATIONS

Machine translation of document N above.*
machine language translation of JP 09-104764 (1997).*
Japanese Office Action issued in Application No. 2008-159914 dated Aug. 22. 2012.

* cited by examiner

*Primary Examiner* — Vickey Nerangis
(74) *Attorney, Agent, or Firm* — Sughrue Mion, PLLC

(57) ABSTRACT

In a wet friction material, inorganic filler of small particle size is added to fill clearances or space between fibers with the inorganic filler. The inorganic filler is attached to the fibers with each other to reinforce strength of the wet friction material when an impregnated resin is hardened. Absolute specific gravity of the inorganic filler is set at a fixed value so as to make its compounding quantity small, thereby assuring a pore diameter of a friction material substrate without filling pores of the friction material substrate with the inorganic filler.

4 Claims, 3 Drawing Sheets

1 friction material substrate
2 inorganic filler
3 fiber

WET FRICTION MATERIAL INCLUDING AN INORGANIC FILLER

BACKGROUND OF THE INVENTION

1. Field of the Invention

This invention relates to a wet friction material that generates a torque by applying a high pressure to an opposite surface while being immersed in oil. In detail, this invention relates to a segment-type friction material made by joining friction material substrates that were cut into a segment piece onto one or both surfaces of a core metal of a flat ring shape along an entire circumference thereof with an adhesive. Otherwise, this invention relates to a ring-shaped friction material made by joining ring-shaped friction material substrates onto one or both surfaces of a core metal of a flat ring shape thereof with an adhesive.

2. Description of the Related Art

In recent years, for the purpose of reducing a shift-shock by multistage of an automatic transmission, which may be referred to as "AT" hereafter, of an automobile or the like, it is required to improve a shift transmission feature (engagement/disengagement feature) in a wet friction material which is used for AT. To improve a disengagement feature, it is effective to make it harder for an oil film which is cased by an automatic transmission fluid, which may be referred to as "ATF" hereafter, to generate between a friction surface of a wet friction material and a counterpart plate in a disengaged state by making a pore diameter of the wet friction material large or by increasing a porosity. ("ATF" is a registered trademark of Idemitsu Kosan Co., Ltd.) According to an invention described in Japanese Laid Open Patent Publication No. 2004-138121, there is provided a wet friction material that it includes silica of an average particle size 1 μm to 10 μm and a disk-shaped diatom earth in paper substrates. Also, this wet friction material uses a hardened material of liquid resin composition that can be obtained by mixing resol-type phenolic resin and silicone resin as a bounding material. Accordingly, it can obtain a wet friction material that is greater in heat resistance (resistant heat spot) and is improved a positive μ-V slope characteristic while having a high friction coefficient.

However, in the wet friction material described in the above Japanese Laid Open Patent Publication No. 2004-138121, it contains diatom earth that an absolute specific gravity is low, which is 25% by weight to 45% by weight of paper substrates, and inter-fiber pores of paper substrates are filled in with the diatom earth. Therefore, a pore diameter becomes small and there is a possibility that it can not obtain a preferable disengagement feature. In contrast, if it increases fibrillation of fibers of paper substrates or decreases lining density so as to increase pore diameter or porosity, there is a problem that it generates negative effects such as strength reduction or increase in settling quantity etc.

Then, an object of this invention is to provide a wet friction material that it is greater in a disengagement feature by increasing a pore diameter of a wet friction material as well as reducing a drag torque, while it is greater in a positive μ-V slope characteristic without generating such negative effects, strength reduction or increase in settling quantity etc.

BRIEF SUMMARY OF THE INVENTION

According to a first aspect of the invention, there is provided a wet friction material made by joining friction material substrates that it impregnates a paper body containing fiber component and filler component with the thermosetting resin and makes it harden by heat to form onto one or both surfaces of a core metal of a flat ring shape. In the above filler component, it contains one or more than two kinds of inorganic fillers that: an average particle size is within a range of 0.3 μm to 10 μm; an absolute specific gravity is within a range of 4 to 6; Moh's hardness is within a range of 3 to 8, within a range of 5% by weight to 40% by weight of an entire paper body mentioned above.

Here, "a wet friction material" includes a segment-type friction material made by joining friction material substrates that were cut into segment pieces onto a surface of a core metal of a flat ring shape thereof with an adhesive. Also, this wet friction material includes a ring-shaped friction material made by joining ring-shaped friction material substrates onto the surface of the core metal of the flat ring shape thereof with an adhesive.

Additionally, "an absolute specific gravity" is a corresponding term for "a bulk specific gravity". That means an inherent specific gravity of a material which makes up inorganic filler, not a bulk specific gravity (apparent density) when there is a space in inorganic filler. For "inorganic filler" that meets a requirement described in claim 1, there are zinc oxide, barium sulfate, and titanium oxide etc. Especially, it is preferable to use zinc oxide of the average particle size 0.3 μm to 1.0 μm, the absolute specific gravity of 5.5 to 6.0, and the Moh's hardness of 4 to 5 or barium sulfate of the average particle size 3 μm to 10 μm, the absolute specific gravity of 4.0 to 4.5, and the Moh's hardness of 3 to 4 as inorganic filler.

According to a second aspect of the invention, there is provided a wet friction material made by joining friction material substrates that it impregnates a paper body which is formed by that a part of filler component and fiber component is carried out papermaking with the thermosetting resin after adding inorganic filler which is a remnant of the above filler component and then makes it harden by heat to form onto one or both surfaces of the core metal of the flat ring shape thereof with an adhesive. Otherwise, this wet friction material is made by joining friction material substrates that it impregnates the paper body which is formed by that a part of the filler component and the fiber component with the thermosetting resin added the inorganic filler which is a remnant of the above filler component and then makes it harden by heat to form onto one or both surfaces of the core metal of the flat ring shape thereof with an adhesive. The above inorganic filler is one or more than two kinds of inorganic fillers that: the average particle size is within a range of 0.3 μm to 10 μm, the absolute specific gravity is within a range of 4 to 6 and the Moh's hardness is 3 to 8, and that is added within a range of 5% by weight to 40% by weight of the entire paper body mentioned above.

According to a third aspect of the invention, in one of compositions of claim 1 or claim 2, there is provided a wet friction material that a content in the above fiber component is within a range of 30% by weight to 60% by weight in the above paper body, and a content in the above filler component is within a range of 40% by weight to 70% by weight in the above paper body.

According to a third aspect of the invention, there is provided a wet friction material that a content in the above fiber component is within a range of 30% by weight to 60% by weight in the above paper body, and a content in the above filler component is within a range of 40% by weight to 70% by weight in the above paper body.

According to a fourth aspect of the invention, there is provided a wet friction material that a peak of a pore diameter distribution of the above friction material substrates measured by a mercury intrusion technique is within a range of 1

μm to 20 μm, and a porosity of the above friction material substrates is within a range of 30% to 70%.

According to the first aspect of the invention, there is provided a wet friction material made by joining friction material substrates that it impregnates the paper body containing fiber component and filler component with the thermosetting resin and makes it harden by heat to form onto one or both surfaces of the core metal of the flat ring shape thereof with an adhesive. Also, this wet friction material includes one or more than two kinds of inorganic fillers that: the average particle size is within a range of 0.3 μm to 10 μm; the absolute specific gravity is within a range of 4 to 6; and the Moh's hardness is 3 to 8, within a range of 5% by weight to 40% by weight to the entire paper body.

Here, "a wet friction material" includes a segment-type friction material made by joining friction material substrates that were cut into segment pieces onto a surface of a core metal of a flat ring shape, and it also includes a ring-shaped friction material made by joining ring-shaped friction material substrates onto the surface of the core metal of the flat ring shape. Additionally, "absolute specific gravity" is a corresponding term for "a bulk specific gravity". That means an inherent specific gravity of a material which makes up inorganic filler, not a bulk specific gravity (apparent density) when there is a space in inorganic filler. For "inorganic filler", there are zinc oxide, barium sulfate, and titanium oxide etc. Especially, it is preferable to use zinc oxide of the average particle size 0.6 μm, the absolute specific gravity 5.5 to 6.0 and the Moh's hardness 4 to 5 or barium sulfate of the average particle size 3 μm to 10 μm, the absolute specific gravity 4.0 to 4.5 and the Moh's hardness 3.0 to 4.0 as inorganic filler.

As a result of an accomplishment of keen and hard experimental study on improvement of disengagement feature of the wet friction material by this inventors, they have finally found that it requires to include one or more than two kinds of inorganic fillers: the average particle size is within a range of 0.3 μm to 10 μm; the absolute specific gravity is 4 to 6; and the Moh's hardness is 3 to 8 in the filler component within a range of 5% by weight to 40% by weight to the entire paper body so as to improve a disengagement feature keeping strength of the wet friction material. Then, they have completed this invention on the basis of this knowledge.

That is, it can obtain an effect to improve strength of friction material substrates by that the inorganic fillers attach to inter-fiber by adding small-particle inorganic fillers and it connects the inter-fiber when hardening the impregnated resin. Moreover, it can secure the pore diameter of friction material substrates without being filled in pores of the friction material substrates with inorganic fillers, while compounding quantity becomes small by keeping the absolute specific gravity of inorganic fillers. Thus, it becomes faster to absorb ATF from the friction surface and the disengagement feature can be improved.

At this point, in case that the average particle size of the inorganic filler is less than 0.3 μm, it is harder to entwine with fibers when carrying out papermaking and can not mix them in stable condition since it runs with water from a paper net. In contrast, if the average particle size is more than 10 μm, pore diameter becomes small by that inter-fiber pores are filled in with inorganic fillers, and also an effect to improve the strength of friction material substrates by connecting the inter-fiber becomes low, which is caused by reducing a number of particles of inorganic fillers.

Moreover, if the absolute specific gravity is less than 4, pores are filled in because it increases the compounding quantity and the particle number, also it can not obtain a preferable disengagement feature by getting small the pore diameter or lowering the porosity. In contrast, if the absolute specific gravity is more than 6, it decreases the compounding quantity and the particle number, therefore, an effect to improve the strength of friction material substrates by connecting the inter-fiber becomes low, and also it can not be dispersed in friction material substrates uniformly by deteriorating dispersibilty when carrying out papermaking.

Furthermore, if the Moh's hardness is less than 3, there is possibility that it deteriorates a friction coefficient or inorganic filler becomes worn away when the friction surface is engaged with the counterpart plate. In contrast, if the Moh's hardness is more than 8, it rises an aggression against the counterpart plate and makes the counterpart plate become worn away. Also, if inorganic filler is less than 5% by weight to paper body, it can not secure a pore diameter because other compounding ratio of filler or fiber is large. On the other hand, if the inorganic filler is more than 40% by weight to the paper body, it also increases the compounding quantity and the particle number. Therefore, it can not secure the pore diameter.

Thus, there is provided a wet friction material that is superior to the disengagement feature by extending the pore diameter of the wet friction material as well as reducing the drag torque, while it is greater in the positive μ-V slope characteristic without generating such negative effects as strength reduction or increase in settling quantity etc.

According to a second aspect of the invention, there is provided a wet friction material made by joining friction material substrates that it impregnates a paper body which is formed by that a part of filler component and fiber component is carried out papermaking with the thermosetting resin after adding an inorganic filler which is a remnant of the filler component and makes it harden by heat to form onto one or both surfaces of the core metal of the flat ring shape thereof with an adhesive. Otherwise, this wet friction material is made by joining friction material substrates that it impregnates a paper body which is formed by that a part of filler component and fiber component is carried out papermaking with the thermosetting resin added the inorganic filler which is a remnant of the filler component and makes it harden by heat to form onto one or both surfaces of the core metal of the flat ring shape thereof with an adhesive. Additionally, the above inorganic filler is one or more than two kinds of inorganic fillers that the average particle size is within a range of 0.3 μm to 1.0 μm, the absolute specific gravity is within a range of 4 to 6 and the Moh's hardness is 3 to 8, and that is added within a range of 5% by weight to 40% by weight of the entire paper body mentioned above.

In the wet friction material according to this invention, only a production method is different a little between friction material substrates and wet friction materials according to the first aspect of the invention, and it can obtain substantially equivalent friction material substrates. Therefore, it is possible to obtain a similar working effect with the same reason as the wet friction material according to the first aspect of the invention.

Thus, there is provided a wet friction material that is superior to the disengagement feature by extending the pore diameter of the wet friction material as well as reducing the drag torque, while it is greater in the positive μ-V slope characteristic without generating such negative effects as strength reduction or increase in settling quantity etc.

According to a third aspect of the invention, there is provided a wet friction material that a content of fiber component is within a range of 30% by weight to 60% by weight in a paper body. Also, a content of filler component is within a range of 40% by weight to 70% by weight in the paper body.

If a content of the fiber component is less than 30% by weight, there is possibility that it deteriorates the strength of the friction material and it is harder for the filler component to entwine with fibers and can not compound in stable condition when carrying out papermaking. In contrast, if a content of the fiber component is more than 60% by weight, it gets small the pore diameter and lowers the porosity, thus there is possibility that it can not obtain a preferable disengagement feature. Therefore, it is preferable that the content of the fiber component is within a range of 40% by weight to 70% by weight in the paper body of the filler component.

In a relative relation with this, if a content of the filler component is less than 40%, there is possibility that it gets small the pore diameter and lowers the porosity by fibers, and it can not obtain a preferable disengagement feature. In contrast, if a content of the filler component is more than 70% by weight, there is possibility that it deteriorates the strength of the frictional material because the fiber component decreases. Also, there is possibility that it is harder for the filler component to entwine with fibers when carrying out papermaking and can not compound in stable condition. Therefore, it is preferable that a content of the filler component is within a range of 40% by weight to 70% by weight in the paper body.

Thus, there is provided a wet friction material that is superior to the disengagement feature by extending the pore diameter of the wet friction material as well as reducing the drag torque, while it is greater in the positive μ-V slope characteristic without generating negative effects such as strength reduction or increase in settling quantity etc.

According to a fourth aspect of the invention, there is provided a wet friction material that a peak of the pore diameter distribution of the above friction material substrates measured by a mercury intrusion technique is within a range of 1 μm to 20 μm, and a porosity of the above friction material substrates is within a range of 30% to 70%. In case that a peak of the pore diameter distribution measured by the mercury intrusion technique is less than 1 μm or the porosity is less than 30%, there is possiblity that it deteriorates the disengagement feature or the heat resistance by decreasing ATF absorbing effect of the wet friction material and its discharging effect. Also, in case that a peak of the pore diameter distribution of friction material substrates measured by the mercury intrusion technique is more than 20 μm or the porosity is more than 70%, there is possibility that it deteriorates the strenght of the wet friction material or occures a biting shock by that ATF absorbing effect and the discharging effect are too high Accordingly, it is preferable that a peak of the pore diameter distribution of friction material substrates measured by the mercury intrusion technique is within a range of 1 μm to 20 μm and the porosity is within a range of 30% to 70%.

Thus, there is provided a wet friction material that is superior to the disengagement feature by extending the pore diameter of the wet friction material as well as reducing the drag torque, while it is greater in the positive μ-V slope characteristic without generating negative effects such as strength reduction or increase in settling quantity etc.

DETAILED DESCRIPTION OF THE INVENTION

Next, a wet friction material according to preferred embodiments of the invention is described hereinafter referring to FIG. 1 to FIG. 4.

Figure 1A:
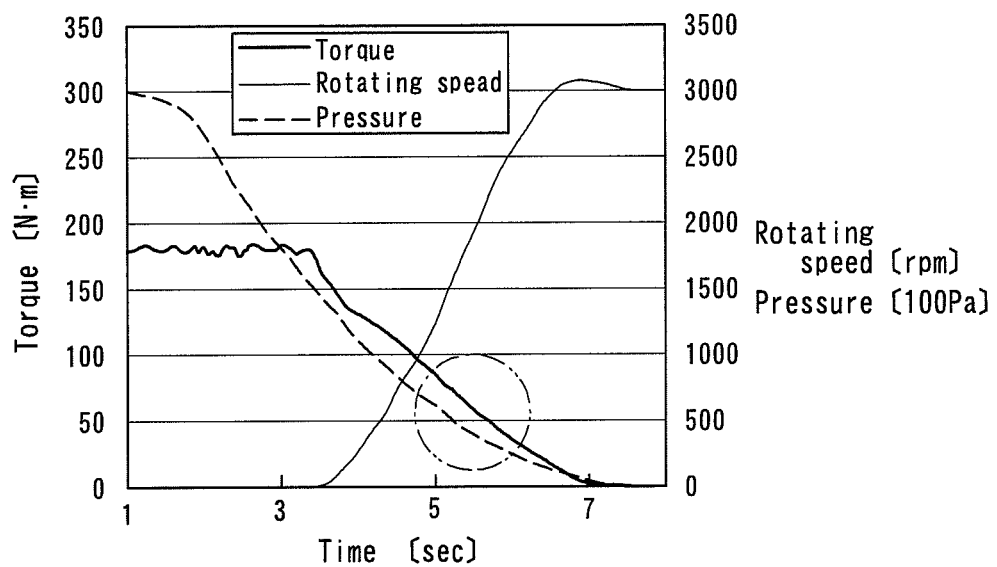
FIG. 1a is a graph showing a disengagement feature of a wet friction material according to an embodiment of this invention.

FIG. 1a is a graph showing a disengagement feature of a wet friction material according to an embodiment of the invention.

Figure 1B:
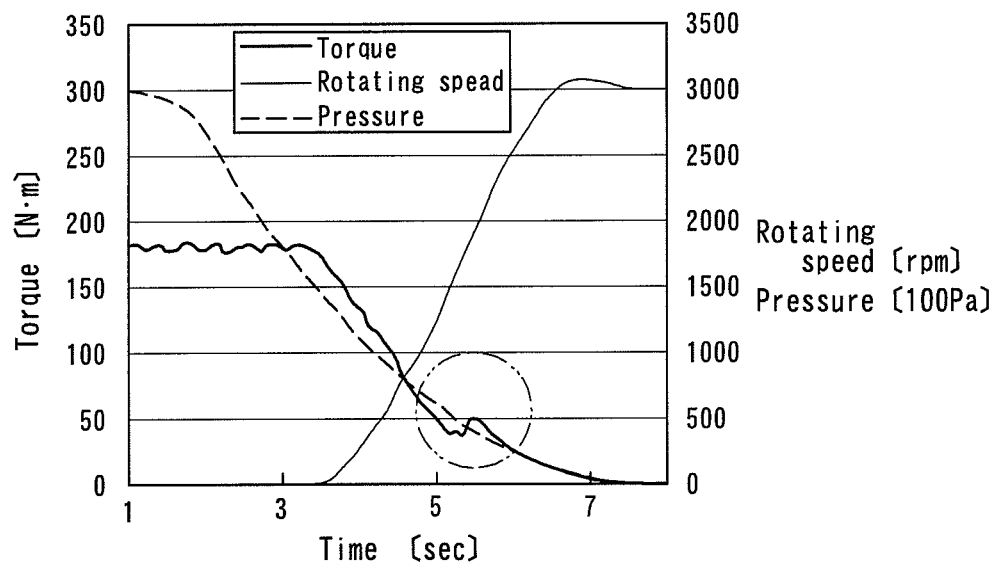
FIG. 1b is a graph showing a disengagement feature of a conventional wet friction material.

FIG. 1b is a graph showing a disengagement feature of a conventional wet friction material.

Figure 2:
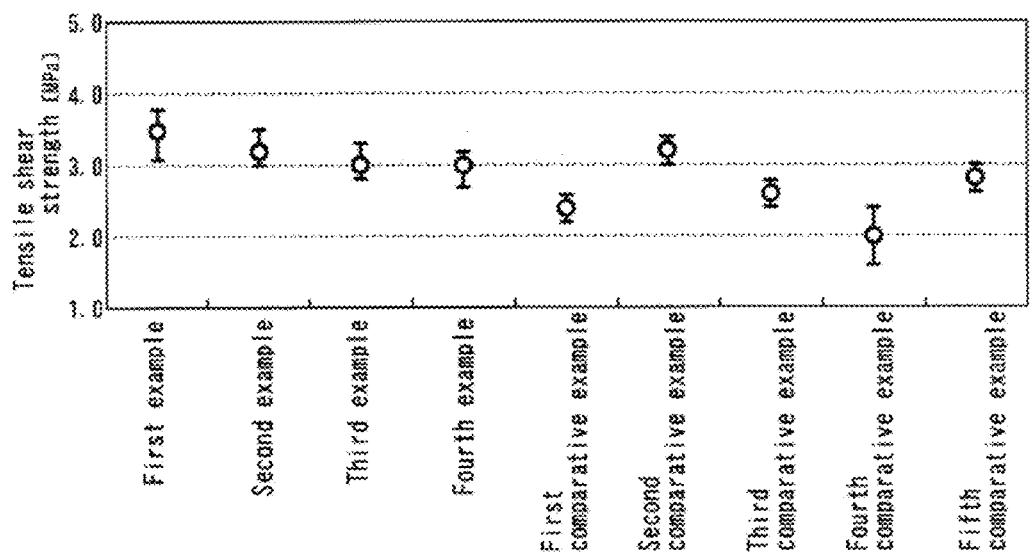
FIG. 2 is a graph showing shear strength of friction material substrates of the wet friction material according to the embodiment of this invention compared to comparative examples.

FIG. 2 is a graph showing shear strength of friction material substrates of the wet friction material according to the embodiment of the invention compared to comparative examples.

Figure 3A:
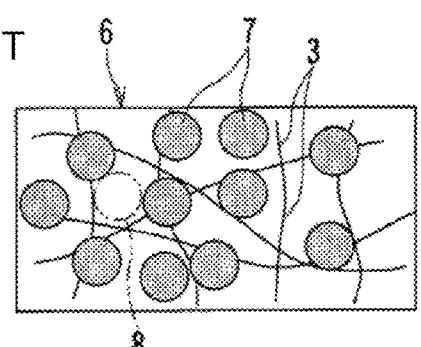
FIG. 3a is a view showing a frame format of an inner structure of conventional friction material substrates.

FIG. 3a is a view showing a frame format of an inner structure of conventional friction material substrates.

Figure 3B:
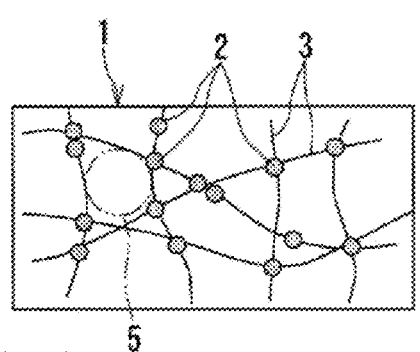
FIG. 3b is a view showing a frame format of an inner structure of friction material substrates of the embodiment of this invention.

FIG. 3b is a view showing a frame format of an inner structure of friction material substrates according to the embodiment of the invention.

Figure 4:
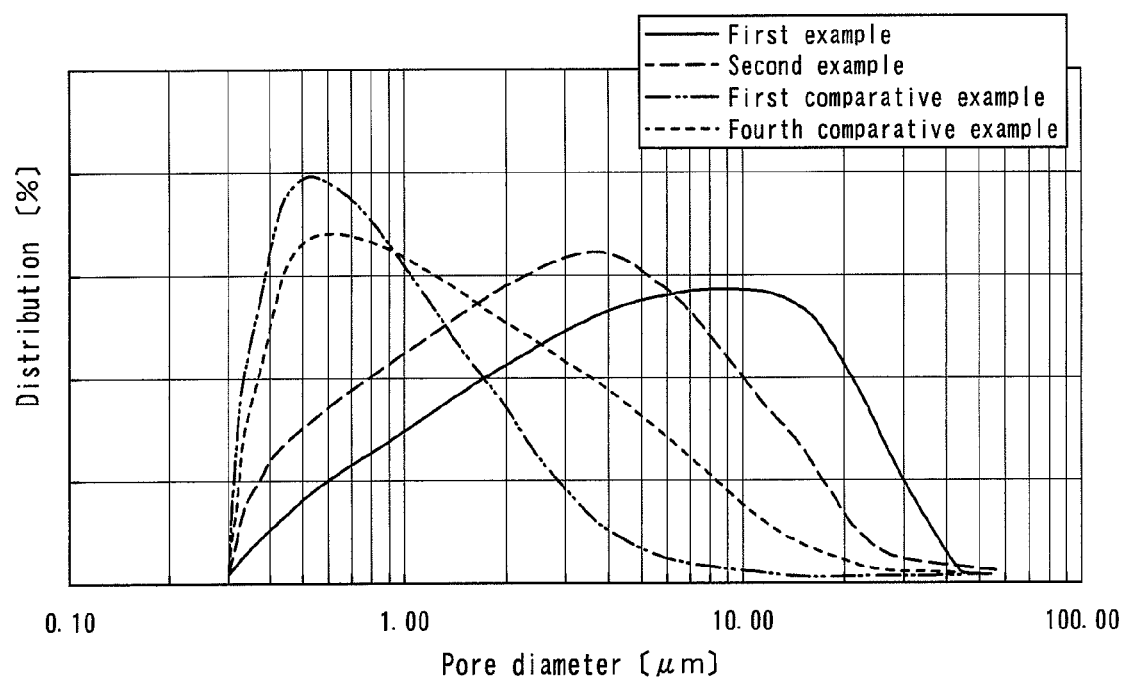
FIG. 4 is a graph showing a pore diameter distribution of friction material substrates of the wet friction material according to the embodiment of this invention compared to comparative examples.

FIG. 4 is a graph showing a pore diameter distribution of friction material substrates of the wet friction material according to the embodiment of the invention compared to comparative examples.

First, a production method or composing materials that make up friction material substrates of the wet friction material according to preferred embodiments of the invention are described referring to TABLE 1.

TABLE 1

Unit: % by weight

| Composing material | Particle size [μm] | Absolute specific gravity | Mohs hardness | First example | Second example | Third example | Fourth example | First comparative example | Second comparative example | Third comparative example | Fourth comparative example | Fifth comparative example |
|---|---|---|---|---|---|---|---|---|---|---|---|---|
| Fiber | | | | 55 | 50 | 50 | 35 | 50 | 45 | 50 | 35 | 55 |
| Filler | | | | 40 | 30 | 10 | 60 | 30 | 35 | 35 | 45 | 40 |
| Inorganic filler A | 6 | 2.3 | 7 | — | — | — | — | 20 | — | — | 10 | — |
| Inorganic filler B | 1 | 2.3 | 7 | — | — | — | — | — | 20 | — | 10 | 5 |
| Inorganic filler C | 0.6 | 5.5 | 5 | 5 | — | 20 | — | — | — | — | — | — |

TABLE 1-continued

| Composing material | Particle size [μm] | Absolute specific gravity | Mohs hardness | First example | Second example | Third example | Fourth example | First comparative example | Second comparative example | Third comparative example | Fourth comparative example | Fifth comparative example |
|---|---|---|---|---|---|---|---|---|---|---|---|---|
| | | | | | | | | | | | | Unit: % by weight |
| Inorganic filler D | 10 | 4.2 | 3 | — | 20 | 20 | — | — | — | — | — | — |
| Inorganic filler E | 0.3 | 4.3 | 7.5 | — | — | — | 5 | — | — | — | — | — |
| Inorganic filler F | 2 | 2.7 | 3 | — | — | — | — | — | — | 15 | — | — |
| Total [wt %] | | | | 100 | 100 | 100 | 100 | 100 | 100 | 100 | 100 | 100 |
| Phenolic resin [wt %] | | | | 35 | 35 | 35 | 35 | 35 | 35 | 35 | 35 | 35 |
| Porosity | | | | 65 | 50 | 40 | 55 | 40 | 50 | 55 | 60 | 50 |
| Disengagement feature | | | | ◎ | ◎ | ○ | ○ | X | X | Δ | Δ | Δ |
| Strength | | | | ○ | ○ | ○ | ○ | X | ○ | X | X | Δ |

As shown in TABLE 1, as a composition of friction material substrates of a wet friction material according to the embodiment of the invention, it produces friction material substrates making use of four kinds of compositions according to a first example to a fourth example. And for comparison, it produces another friction material substrates making use of five kinds of compositions according to a first comparative example to a fifth comparative example. In composing materials shown in TABLE 1, it uses aramid fiber, pulp for a fiber and diatom earth, graphite and carbon fiber for filler. Also, it makes use of diatom earth for "inorganic filler A, B", zinc oxide for "inorganic filler C", barium sulfate for "inorganic filler D", titanium oxide for "inorganic filler E" and calcium carbonate for "inorganic filler F" each.

At this point, the inorganic filler C (zinc oxide), the inorganic filler D (barium sulfate), and the inorganic filler E (titanium oxide) that are used for four kinds of composing materials according to the first example to the fourth example meet all of the following requirements of the invention: the average particle size is within a range of 0.3 μm to 10 μm; the absolute specific gravity is within a range of 4 to 6; and the Moh's hardness is within a range of 3 to 8. The average particle size of the inorganic filler C, D and E each is a value measured by a laser diffraction method or an air permeability method. In contrast, the absolute specific gravity is low in the inorganic filler A, B (diatom earth) and the inorganic filler F (calcium carbonate) also and it does not meet any requirements of the invention.

According to the compounding quantity shown in TABLE 1, it compounds these composing materials each and makes slurry by dispersing those mixtures in water, and then it produces paper substrates by drying paper that was carried out papermaking from the slurry. As shown in TABLE 1, it impregnates 35 by weight of phenolic resin against 100 by weight of paper substrates each, and then it dries and heats at 200 degrees for 30 minutes to harden the phenolic resin and produces friction material substrates. Regarding the resultant friction material substrates, it evaluated a disengagement feature and strength each. These evaluation results including an evaluation result of the porosity described below are shown in lower stage of TABLE 1.

For the evaluation of the disengagement feature, the resultant friction material substrates were cut into segment pieces at prescribed shape and it joined the 40 segment-piece-shaped friction material substrates each onto both surfaces of the core metal of the flat ring shape having an outer diameter Ø of 176 mm and an inner diameter Ø of 154 mm in a disk size so as to make a segment-type friction material. Then, it evaluated the disengagement feature in a test condition that: a number of disks is 3; a relative rotating speed is 3000 rpm; ATF oil temperature is 40 degrees; ATF oil quantity 2.4 l/min; a surface pressure is 0.8 MPa; and weight sweeping time is about 4 seconds.

Additionally, in the same test condition, it obtained the same test result when it evaluated a disengagement feature in a ring-shaped friction material made by that the resultant friction material substrates were cut into as the ring shape and it joined the ring-shaped friction material substrates onto both surfaces of the core metal of the flat ring shape of the outer diameter Ø 176 mm and the inner diameter Ø 154 mm in the disk size and applied 40 oil grooves per one side by pressing thereof. That is, evaluation result hereinafter described is common to the wet friction material that there are 40 oil grooves per one side. The test result is shown in FIG. 1a.

As shown in FIG. 1a, according to a composition of the first example of this embodiment, there is provided a wet friction material that the torque reduces smoothly as it becomes free from a pressure and it turns out that it can obtain an ideal disengagement feature. In contrast, as shown in FIG. 1b, according to a composition of the first comparative example, there is provided a wet friction material that it generates a rapid torque fluctuation at a portion where it is surrounded by a circle written with a chain double-dashed line, and it found that there is a problem in the disengagement feature.

Also, regarding an evaluation of strength, it measured tensile shear strength for each of a plurality of test specimens that the resultant friction material substrates were cut into as 20 mm×20 mm at a tensile speed of 5 mm/min. The test result is shown in FIG. 2. As shown in FIG. 2, friction material substrates according to four kinds of compositions of the first example to the fourth example have a shear strength which is the same or more than that of friction material substrates according to compositions of the second comparative example and the fifth comparative example, and it has a higher shear strength than friction material substrates according to the third comparative example and the fourth comparative example.

As the evaluation result, the friction material substrates according to compositions of the first example to the fourth example of this embodiment are greater in the disengagement feature and the shear strength also compared with the friction material substrates according to compositions of the first comparative example to the fifth comparative example in case of using the segment-type friction material and the ring-shaped friction material. Especially, as shown in lower stage of TABLE 1, it found that it is preferable to use zinc oxide (inorganic filler C) of the average particle size 0.6 μm, the absolute specific gravity 5.5, and the Moh's hardness 5 or barium sulfate (inorganic filler D) of the average particle size 10 μm, the absolute specific gravity 4.2, and the Moh's hardness 3 as an inorganic filler.

For this reason, as shown in FIG. 3a, according to the compositions of the first comparative example to the fifth comparative example, regarding conventional friction material substrates 6, the absolute specific gravity of used inorganic filler 7 there is low and it is bulky, therefore that fills a gap of inter-fiber 3 and pore diameter 8 becomes small. In contrast, as shown in FIG. 3b, according to the compositions of the first example to the fourth example, regarding friction material substrates 1, the absolute specific gravity of used inorganic filler 2 there is high and the average particle size is small, therefore it attaches the inorganic filler 2 to the inter-fiber 3 and can obtain an effect to improve the strength of the friction material substrates 1 by connecting the inter-fiber 3 when hardening the impregnated resin as well as increasing the pore diameter 5, which is considered as a reason above.

Consequently, it compared a pore diameter distribution of friction material substrates according to compositions of the first example and the second example of this embodiment to a pore diameter distribution of friction material substrates according to compositions of the first comparative example and the fourth comparative example. The pore diameter distribution is measured by mercury intrusion technique and the test result is shown in FIG. 4. As shown in FIG. 4, a peak of the pore diameter distribution of friction material substrates according to the first example and the second example is located at a side where the pore diameter is large. In contrast, a peak of the pore diameter distribution of friction material substrates according to the first comparative example and the fourth comparative example is located at a portion where the pore diameter is less than 1 μm.

Additionally, the pore diameter distribution of friction material substrates according to the first example and the second example is to be broad compared to the pore diameter distribution of friction material substrates according to the first comparative example and the fourth comparative example. And in the friction material substrates according to the composition of the first example, the peak of the pore diameter distribution locates at a portion around 12 μm, and in the friction material substrates according to the second example of this embodiment, the peak of the pore diameter distribution locates at a portion around 3.5 μm each. Therefore, the peak of the pore diameter distribution of the friction material substrates according to the first example and the second example measured by mercury intrusion technique is within a range of 1 μm to 20 μm.

This made faster to absorb ATF from the friction surface, therefore it improves the disengagement feature. Moreover, there is provided a wet friction material that is greater in the positive μ-V slope characteristic as well as reducing the drag torque by the rapid absorption of ATF from the friction surface.

In this embodiment, an example making use of a phenolic resin powder as a thermosettig resin is described, however, it can also use other powdery or not powdery thermosetting resins such as modified phenolic resin or epoxy resin. Especially, these phenolic resins, modified phenolic resin, epoxy resin are easily obtainable and greater in the heat resistance, therefore those are preferable as a thermosetting resin of a material of the wet friction material.

Moreover, a case of a wet friction material that a number of oil grooves is 40 per one side is described, however, the number of the oil grooves is not limited to 40 and it can set freely according to required characteristics.

Furthermore, in this embodiment, a case to make friction material substrates by that it makes a paper body containing a filler component which includes a fiber component and inorganic filler, and it impregnates this paper body with a thermosetting resin and then makes it harden by heat to form is described. However, it is also available to make friction material substrates by that after adding inorganic filler which is a remnant of a filler component to a paper body which is made by that a part of the fiber component and the filler component is carried out papermaking, it impregnates the thermosetting resin and makes it harden by heat to form. Otherwise, it is possible to make friction material substrates by that it impregnates the paper body which is made by that a part of the fiber component and the filler component is carried out papermaking with a thermosetting resin added the inorganic filler which is a remnant of the filler component and then makes it harden by heat to form.

In the practice of this invention, it is not limited to each embodiment regarding a structure, a component, a composition quantity, a material, a dimension, a production method or the like of other portions of the wet friction material.

Also, the numeric value which is described in the embodiment of this invention is not anything to indicate a critical value, but to indicate the preferred value that is suitable for enforcement. Therefore, it is not anything to deny the enforcement even if the numeric value mentioned above is changed a little.

The invention claimed is:

1. A wet friction member comprising:

a core metal of a flat ring shape; and a friction material substrate formed by impregnating a thermosetting resin with a paper body containing a fiber component and a filler component and hardening it by heat, wherein one or more kinds of an inorganic filler are included in the filler component within a range of 5% by weight to 40% by weight to a total weight of the paper body, wherein the inorganic filler consists of filler having an average particle size within a range of 0.3 to 10 μm, an absolute specific gravity within a range of 4 to 6, and Moh's hardness within a range of 3 to 8, wherein the friction material substrate being joined onto one or both surfaces of the core metal of the flat ring shape;

wherein the peak of the pore diameter distribution of the friction material substrate measured by a mercury intrusion technique is set within a range of 1 μm to 20 μm, and the porosity of the friction material substrate is set within a range of 30% to 70%, and wherein the particles of the one or more kinds of the inorganic filler attach to the fiber component of the paper body of the friction material substrate so as to interconnect the fibers of the friction material substrate.

2. The wet friction member according to claim 1, in which the inorganic filler is a barium sulfate having an average particle size within a range of 3 to 10 μm, an absolute specific gravity within a range of 4.0 to 4.5, and a Moh's hardness within a range of 3 to 4.

3. The wet friction member according to claim 2, in which the peak of the pore diameter distribution of the friction material substrate measured by a mercury intrusion technique is set at around 3.5 μm, and the porosity of the friction material substrate is set within a range of 40% to 50%.

4. A wet friction member comprising:
a friction material substrate formed by impregnating a thermosetting resin with a paper body containing a fiber component and a filler component and hardening it by heat, the friction material substrate being joined onto one or both surfaces of a core metal of a flat ring shape; and an inorganic filler contained in the friction material substrate for securing a pore diameter of pores formed between fibers of the fiber component of the paper body and for keeping the pores from being filled with particles of another inorganic filler,
wherein one or more kinds of the inorganic filler being included in the filler component within a range of 5% by weight to 40% by weight to a total weight of the paper body,
wherein the inorganic filler consists of filler having an average particle size within a range of 0.3 to 10 μm, an absolute specific gravity within a range of 4 to 6, and Moh's hardness within a range of 3 to 8,
wherein the friction material substrate containing the one or more kinds of the inorganic filler has a peak of a pore diameter distribution and a porosity within a range to make faster absorption of an automatic transmission fluid from a surface of the friction material than a friction material having pores filled with the particles of the another inorganic filler, and
wherein the particles of the one or more kinds of the inorganic filler attach to the fiber component of the paper body of the friction material substrate so as to interconnect the fibers of the friction material substrate.

* * * * *